United States Patent

[11] 3,562,482

[72] Inventors Andrzej Friedberg
Chambly, Quebec;
Andreas Keusch, Ville Brossard, Quebec, Canada
[21] Appl. No. 745,277
[22] Filed July 16, 1968
[45] Patented Feb. 9, 1971
[73] Assignee Northern Electric Company Limited
Montreal, Quebec, Canada

[54] SELF-ALIGNING ELECTRODE TIP HOLDER
7 Claims, 5 Drawing Figs.
[52] U.S. Cl............................................................. 219/86,
219/119
[51] Int. Cl........................................................ B23k 11/10
[50] Field of Search........................................... 219/86,
119, 158, 144; 279/1L, 16

[56] References Cited
UNITED STATES PATENTS
| | | | |
|---|---|---|---|
| Re.25,318 | 1/1963 | Benjamin et al. | 219/119UX |
| 2,346,088 | 4/1944 | Shobert | 219/119 |
| 2,848,239 | 8/1958 | Benjamin et al. | 279/16 |
| 3,161,753 | 12/1964 | Schmick | 219/79 |

OTHER REFERENCES
"Collet Welding Electrode," IBM Technical Disclosure Bulletin, Vol. 5, No. 1, June 1962, p. 10.

*Primary Examiner*—J. V. Truhe
*Assistant Examiner*—J. G. Smith
*Attorney*—Curphey and Erickson ABSTRACT: The invention relates to an electrode holding and self-aligning device on a transistor encapsulation welding machine for insuring parallelism between the contact surfaces of top and bottom electrodes. The device consists of a hollow cylindrical taper, the wall of which is partly sectioned by elongated equally distanced slots. The upper end of the taper is provided with a recess for receiving the bottom electrode. The bottom assembly consisting of electrode and electrode holding device is inserted in a cavity situated in the base of the welding machine. When the top electrode assembly is forced under suitable pressure onto the bottom electrode assembly, the taper self-adjusts in the cavity thereby bringing the contact surface of the bottom electrode into parallelism with the contact surface of the top electrode.

INVENTORS
A. FRIEDBERG
A. KEUSCH

AGENTS
Curphey & Erickson

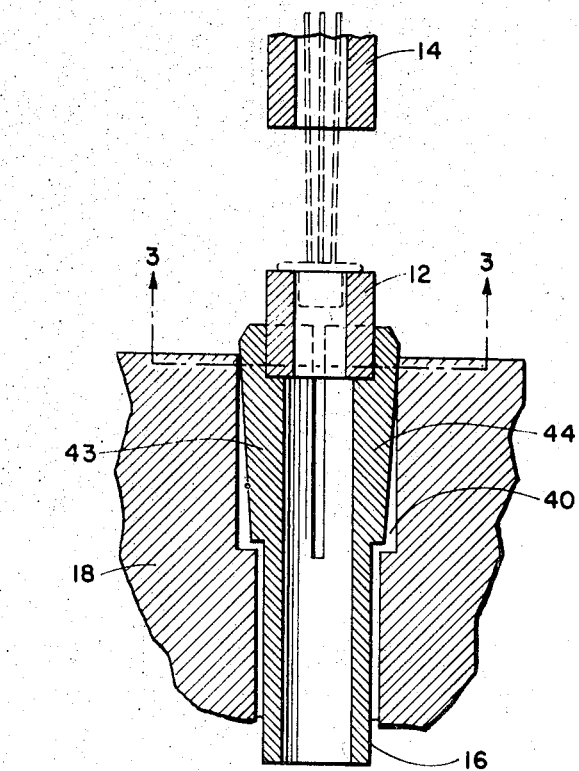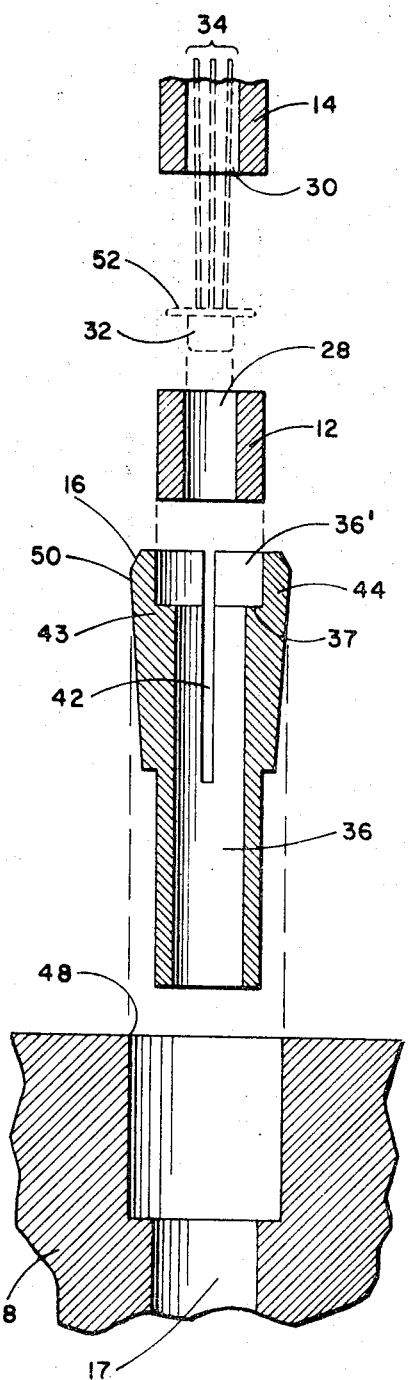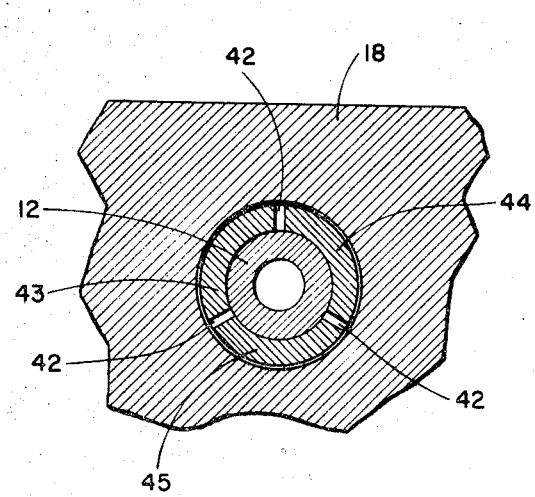

INVENTORS
A. FRIEDBERG
A. KEUSCH

AGENTS
Curphey & Erickson

SELF-ALIGNING ELECTRODE TIP HOLDER

This invention relates to a welding machine such as a transistor encapsulation welding machine. More particularly, this invention relates to an electrode tip holding device used in connection with a transistor encapsulation welding machine.

In order to provide a leakproof circumferential weld on a transistor cartridge, it is of the utmost importance that the working surfaces of the two electrodes be substantially parallel. This requirement of a leakproof weld is so essential in the finished produce that all transistor cartridges which have not acquired this quality during the welding process are rejected. If these transistors were used, they would fail to operate in moist atmosphere for example. Good hermeticity is therefore needed to provide the transistor with greater efficiency and longer life. Furthermore, because the electrode tip sustains a considerable rate of wear, it is important that the electrode tip be readily and easily exchangeable, cheap to manufacture and easily dressed.

Several designs have been conceived in the past in an attempt to provide a transistor cartridge with a perfect circumferential weld. One design which is presently in use is concerned with providing an electrode whose holding mechanism floats on a cushion of air. This floating characteristic allows adjustment of the lower electrode relative to the upper electrode to obtain parallelism might be between the working surfaces of both electrodes. However, this method of "floating" the bottom electrode is very expensive and has many disadvantages. It has been found that a lot of time was spent setting up the parts each time it was necessary to remove the bottom electrode and to replace it by another to suit the different shape and structure of other cartridges. Also, when the parts were once dismantled, the holding device was susceptible to damage. Since it was preferable to have the assembly dismantled as few times as possible, the dressing was done when the assembly was in place, a quite difficult and time consuming operation.

It is an object of this invention to provide a self-aligning electrode holding device with the required adjustability that ensures, for all practical purposes, parallelism between the two electrodes of a welding machine such as a transistor encapsulation machine, which provides reduced manufacturing costs, labor and materials, and which facilitates removal of the device for redressing the electrode.

Another feature of this invention is that, in order to obtain quicker parallelism between the contact surfaces of both electrodes, the top electrode is also provided with an electrode holder which is constructed and operated in a manner similar to the bottom electrode holder.

Another feature of the present welding machine is the provision of an ejecting mechanism thereon. Once the transistor cartridges are welded, they must be removed from the welding machine. Previous methods of removal have led to unsatisfactory results; for instance, it was found that removing the cartridges by hand occasioned breakage of transistor leads. This invention overcomes this problem by providing an ejecting mechanism which is slidably mounted on the machine and, when in one position, greatly facilitates the removal of the welded cartridge without damaging the same.

In order that the invention may be readily understood, preferred embodiments thereof will now be described, by way of example, with reference to the accompanying drawings in which:

FIG. 2 is a secton of the line 2—2 of FIG. 1, with the additional showing of a transistor cartridge;

FIG. 3 is a top plan view taken along the line 3—3 of FIG. 2;

FIG. 4 is an exploded cross-sectional view of FIG. 2; and

Figure 1:
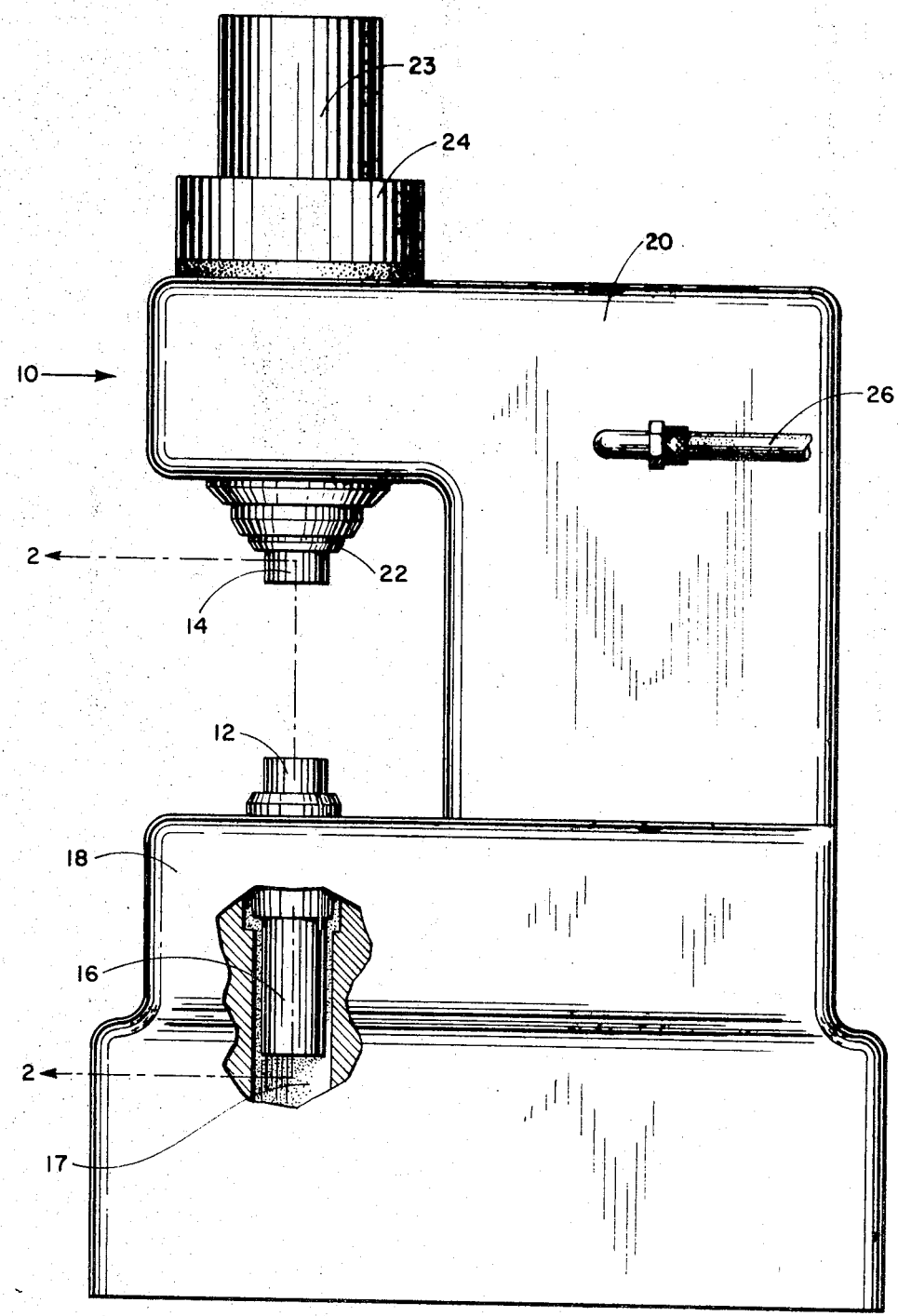
FIG. 1 is a side elevation partly in section of one embodiment of the invention.

FIG. 1 shows a transistor encapsulation welding machine 10 principally consisting of a pair of vertically spaced electrodes 12 and 14; the welding machine also consists of a base 18 and a frame 20. The top electrode 14 is held by a first electrode holding device 22 which, in turn, is secured to the frame 20 by means of an adapter 23 and a bushing 24. One portion of base 18 is used for mounting frame 20 while the remaining portion is provided with a generally cylindrical cavity 17 which is adapted to receive a second electrode holding device 16 in which sits the bottom electrode 12. The top assembly of electrode 14, electrode holding device 22 and adapter 23 is adapted to move toward and away from the bottom electrode 12; the lowering and raising of the top assembly is accomplished in any conventional manner such as, for example, under the hereinafter described action of air pressure which is introduced in the frame 20 of the welding machine through inlet 26.

Referring to FIGS. 2 through 4, bottom electrode 12 and top electrode 14 are each provided with bores 28 and 30, respectively. The bores are adapted to receive any workpiece to be welded such as a transistor cartridge 32 (shown in dotted lines in FIGS. 2 and 4). For illustration purposes, the leads 34 of the transistor have been shown extending above bore 30; however, it can be easily seen that bores 28 and 30 could as well receive transistors having leads extending above and below the cartridge. It will also be evident that many different sizes and shapes of bores can be used to accommodate as many different sizes and shapes of transistors.

A more detailed description of the preferred embodiment of the invention will now be given. The electrode holder 16 is provided with a bore 36, the upper end of which has an enlarged bore 37 so arranged to partially receive bottom electrode 12 so that the upper end of the bottom electrode projects beyond holder 16; the outside diameter of electrode 12 is slightly smaller than the inner diameter 36 of bore 37. Three equally spaced longitudinal slots 42 (FIG. 3) extend from the top end of holder 16 to divide the upper part thereof into three sections 43, 44 and 45. THese slots proceed down the holder to a point whereby a certain degree of resiliency is obtained by the three sections 43, 44 and 45. It is possible to provide the holder with two or more slots but the present invention is concerned mainly with three slots as being the best mode of operation of the holding device. The walls of sections 43, 44 and 45 are tapered so that the outside diameter 50 thereof is slightly greater than the inside diameter at the rim 48 of cavity 17; hence, when the bottom electrode holder 16 is placed in cavity 17, it will be held in a suspended condition contact with rim 48 as shown in FIGS. 1 and 2.

To more clearly understand the detailed description of the transistor encapsulation welding machine 10, the operation thereof will now be described. To illustrate, it is first required, prior to placing the transistor cartridge between the two electrodes, to assemble the machine in order to ensure that the contact surfaces of both electrodes are parallel to one another. The bottom electrode is placed in bore 37 of electrode holder 16. The assembly of electrode 12 and electrode holder 16 is then dropped in cavity 17 of the base 18 until frictional forces between rim 48 and walls 50 of sections 43, 44 and 45 prevent further descent of the assembly in the cavity and leave the assembly in a suspended condition. Air pressure is introduced through inlet 26 to actuate the top assembly so that the working surface of top electrode 14 will engage and press down on the working surface of the bottom electrode 12. Assuming that the working surfaces of the electrode are not parallel to one another initially, one portion of the working surface of the top electrode will contact the high side of the working surface of the bottom electrode. This will cause electrode holder 16 to swing about rim 48 until the working surface of the bottom electrode is parallel with the working surface of the top electrode or, in other words, until the working surface of top electrode lies flat against the working surface of the bottom electrode. The swinging adjustment of the bottom electrode is permitted due to the resiliency of the three portions 43, 44 and 45 of electrode holder 16 which are capable of lateral movement due to the very small gap left between the outside diameter of the bottom electrode 12 and the inner diameter 36 of bore 37. Once the self-adjustment is terminated, downward movement of the bottom electrode assembly is continued until the top portion of portions 43, 44 and 45 are tightly squeezed between electrode 12 and rim 48.

The top assembly is then retracted to its original position and a transistor cartridge is placed with its shoulder 52 lying flat on the working surface of bottom electrode 12. Again the top assembly is moved downward until it comes in contact with the transistor cartridge; since the two electrodes are now parallel to one another, the shoulders of the transistor cartridge will also be parallel to both electrodes. The entire area of shoulders 52 will therefore be in contact with both electrodes. Electric current is then applied by suitable means (not shown) to the welding machine; the current by means of the electrodes is uniformly distributed throughout all sections of the workpiece thereby providing a leakproof circumferential weld on the transistor cartridge.

It is evident that quicker parallelism can be obtained with a welding machine having two self-adjusting electrode holders, one for each electrode. Therefore, this invention is not restricted to a welding machine which is provided only with a self-adjusting holder for the bottom electrode. A welding machine is shown mounted in FIG. 5 wherein the top electrode 14 is held in a top electrode holder 55 which is similar in construction to the bottom electrode holder 16. The top electrode holder 55 which is similar in construction to the bottom electrode holder 16. The top electron holder 55 is provided with three slots (one of which is shown at 57) forming three resilient sections (two of which are shown at 59 and 61). The mounting and the operation of top electrode holder 55 is similar to the mounting and the operation of bottom electrode holder 16.

The top assembly and the bottom assembly are each provided with knockout pins 63 and 65, respectively, which are slidably mounted in their respective assembly to remove the electrode holders when necessary. The construction of each of the knockout pins is different from the other; knockout pin 65 has an elongated portion 66 which protrudes into bore 28 to remove the transistor cartridge 32. Underneath knockout pin 65 is another knockout member 67 which is actuated under the action of air pressure introduced through port 69 in chamber 71. The air introduced is controlled so that, in some cases, a certain amount of pressure will be needed to knock out only the transistor cartridge and, in other cases, greater pressure will be required to remove the whole assembly of electrode holder 16 and bottom electrode 12 from their tight engagement in cavity 17. In the latter case, it is therefore necessary that the bottom plate 73 of knockout pin 65 hit against the surface 75 of the lower end of the electrode holder 16.

Figure 5:
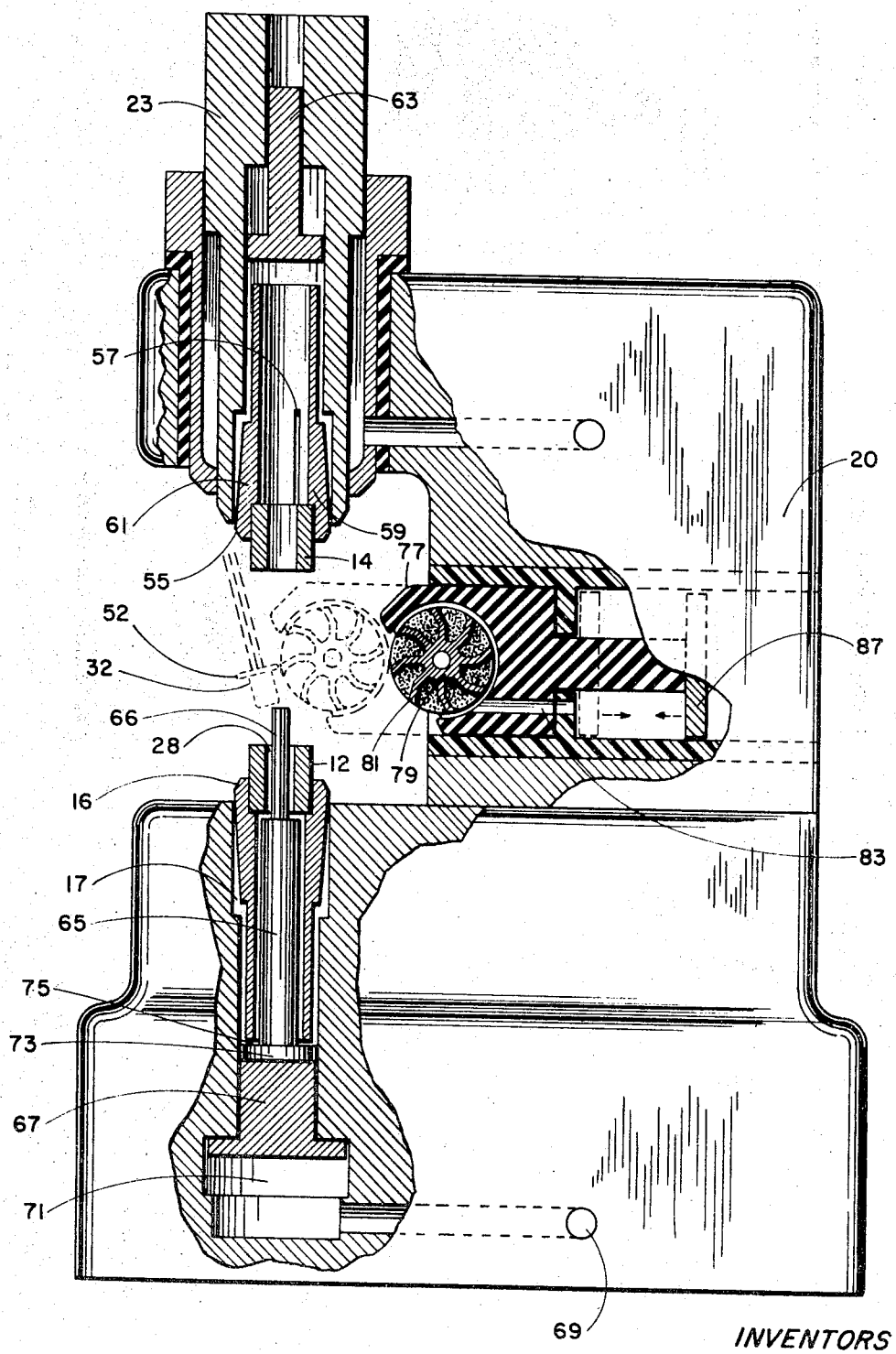
FIG. 5 is a side elevation partly in section of another embodiment having an ejecting mechanism.

FIG. 5 also shows an ejecting mechanism 77 which is adapted to displace the transistor cartridge 32 once the cartridge is knocked out of bottom electrode 12. The ejecting mechanism mainly consists of a wheel 79 with a series of legs 81 radially disposed on the wheel. The wheel is operated to rotate under the action of air pressure introduced through passageway 83. The wheel is mounted in a member 85 which is slidable in frame 20 under the action of air pressure introduced through means (not shown) and acting on end portion 87.

In the operation of the welding machine shown in FIG. 5, the bottom electrode 12 and electrode holder 16 are mounted in the manner which has hereinabove been described. The top electrode 14 and electrode holder 55 are inserted in adapter 23 until frictional forces between the outside walls of the resilient sections of the top electrode holder and the inside wall of the adapter 23 are sufficiently great to hold the top electrode holder in the adapter. When the top assembly is lowered to bring the top electrodes into contact with the bottom electrode, the resilient sections act in a similar manner to the resilient sections 43, 44 and 45 of the bottom assembly in order to adjust the working surface of the top electrode relative to the working surface of the bottom electrode and to obtain parallelism therebetween.

Once the surfaces of both electrodes are parallel to each other, a transistor cartridge is placed on the bottom electrode. The top assembly is once again brought down to contact and to weld the cartridge. The assembly is then raised so that the cartridge can be removed. Air is introduced through inlet 69 in chamber 71 thereby forcing member 67 to raise the knockout pin 65. The top part 66 of pin 65 hits the cartridge 32. While pin 65 is being raised, the ejecting mechanism 77 is, at the same time, being moved outwardly from frame 20 with its wheel 79 spinning. The welded cartridge is knocked out by portion 66 of pin 65; the shoulder 52 of the cartridge is then hit by the tip of one of legs 81 on the wheel. The cartridge is thereby deflected thereby being prevented from bearing against the top assembly.

It can easily be seen that for cartridges having leads which extend above and below the cartridge, a different kind of knockout pin will be required.

We claim:
1. A welding machine comprising in combination:
   a pair of electrodes, each having a working surface and being arranged to be brought into operative engagement to weld a workpiece positioned therebetween;
   an electrode holder for one of the electrodes comprising an elongated member of generally circular cross section being tapered on its outer surface inwardly from one end thereof and having an axial bore opening at said one end, a portion of the bore adjacent said one end being adapted to receive said one electrode, said member having elongated slots extending generally axially from said one end to form resilient sections on the electrode holder;
   a support having a cavity for receiving the electrode holder, the cavity being defined by a wall of a shape to engage said resilient sections at the tapered portion of the electrode holder over an annular area of contact approaching line contact relative to the length of said tapered portion, the remainder of the wall of the cavity being spaced from the outer surface of the elongated member to permit angular adjustment of the electrode holder relative to the wall of the cavity; and
   said resilient sections coacting with the wall of the cavity to grip said one electrode and to align the electrode holder when the electrodes are brought into operative engagement to achieve parallelism of the working surfaces of the electrodes.

2. A welding machine as defined in claim 1 further comprising a knockout member in said cavity for removing said electrode holder therefrom.

3. A welding machine as defined in claim 2 wherein said bore extends through said member and the knockout member has a top portion extending through said bore for dislodging the welded workpiece.

4. A welding machine as define in claim 2 further comprising a second knockout member in said cavity adapted to actuate said first knockout member.

5. A welding machine as defined in claim 1 wherein said second electrode holder consists of a second tubular member having adjacent one end thereof an inner recess for partly containing said second electrode, the wall of said second tubular member being partly sectioned by elongated longitudinal slots, each slot extending from said one end of said second tubular member to a point on said wall thereof to form resilient sections on said second electrode holder.

6. A welding machine as defined in claim 5 wherein pin means are provided in said frame behind said second electrode holder for removing said second electrode holder from said frame.

7. A welding machine as defined in claim 1 wherein the electrode holder is provided with three elongated slots.